(12) United States Patent
Clarke et al.

(10) Patent No.: US 7,551,991 B2
(45) Date of Patent: Jun. 23, 2009

(54) VEHICLE OVER SPEED INDICATOR

(75) Inventors: Bryan Clarke, Dublin (IE); Brian Kearns, Dublin (IE)

(73) Assignee: TDK Corporation, Tokyo (JP)

( * ) Notice: Subject to any disclaimer, the term of this patent is extended or adjusted under 35 U.S.C. 154(b) by 438 days.

(21) Appl. No.: 11/368,377

(22) Filed: Mar. 7, 2006

(65) Prior Publication Data

US 2007/0213883 A1    Sep. 13, 2007

(51) Int. Cl.
*B60T 8/32* (2006.01)
(52) U.S. Cl. .......................................... 701/10; 340/435
(58) Field of Classification Search ................... 701/10, 701/96, 300, 301; 702/143, 150; 340/435, 340/436, 903, 691.1, 691.6, 692; 180/271, 180/274
See application file for complete search history.

(56) References Cited

U.S. PATENT DOCUMENTS

| | | | |
|---|---|---|---|
| 4,703,429 A | 10/1987 | Sakata | |
| 4,916,450 A | 4/1990 | Davis | |
| 5,594,412 A | 1/1997 | Matsumoto | |
| 5,931,547 A | 8/1999 | Lerner | |
| 6,311,121 B1 | 10/2001 | Kuragaki et al. | |
| 6,380,885 B2 | 4/2002 | Shirai et al. | |
| 6,590,495 B1 * | 7/2003 | Behbehani | 340/435 |
| 6,594,614 B2 * | 7/2003 | Studt et al. | 702/150 |
| 6,604,042 B2 | 8/2003 | Maruko et al. | |
| 6,696,929 B2 * | 2/2004 | Igaki et al. | 340/435 |
| 7,002,452 B2 * | 2/2006 | Watanabe et al. | 340/436 |
| 2002/0140551 A1 * | 10/2002 | Gutta et al. | 340/435 |
| 2005/0168328 A1 | 8/2005 | Kitterer et al. | |

OTHER PUBLICATIONS

P. Philip et al; Simple Reaction Time, Duration of Driving and Sleep Deprivation in Young Versus Old Automobile Drivers; *J. Sleep Res.*; vol. 8; 1999; pp. 9-14.

Dennis James Collins; Thesis entitled "An Examination of Driver Performance Under Reduced Visibility Conditions When Using an In-Vehicle Signaling Information System (ISIS)"; Virginia Polytechnic Institute and State University; Apr. 10, 1997.

Thomas J. Triggs et al.; "Reaction Time of Drivers to Road Stimuli"; Monash University Department of Psychology; ISBN 0 86746 147 0; Jun. 1982.

* cited by examiner

*Primary Examiner*—Dalena Tran
(74) *Attorney, Agent, or Firm*—Oliff & Berridge, PLC

(57) ABSTRACT

A method is disclosed for providing an indication that a vehicle has exceeded a safe driving speed. The speed and position of an obstacle are combined with a driver reaction time to arrive at a safe maximum speed. The driver reaction time is predicted based not only on generic values as in known systems, but also on at least one scaling factor which can be, for example, a scaling factor which penalises increased driving duration, or driver age, or experience, or weather conditions.

23 Claims, 5 Drawing Sheets

| Visibility | Factor |
|---|---|
| Very Good | 1 |
| Good | 1.1 |
| Fair | 1.2 |
| Poor | 1.4 |

Fig. 7

| Driver's Experience | Factor |
|---|---|
| Beginner | 1.33 |
| Restricted | 1.11 |
| Full Driver | 1.00 |

Fig. 8

| Driving Time | Factor |
|---|---|
| 0-1 hours | 1.00 |
| 1-4 hours | 1.05 |
| 4-8 hours | 1.2 |
| 8+ hours | 2 |

Fig. 5

| Driver's age | Factor |
|---|---|
| 15-19 | 1.10 |
| 20-40 | 1.00 |
| 40-60 | 1.10 |
| 60-70 | 1.20 |
| 70+ | 1.25 |

Fig. 6

VEHICLE OVER SPEED INDICATOR

TECHNICAL FIELD

This invention relates to the field of vehicle safety devices, such as collision avoidance systems, vehicle radar safety systems and danger warning indicators.

BACKGROUND ART

There are a number of known automotive vehicle safety systems, which are designed to alert the driver of a vehicle if the vehicle is in danger of colliding with a stationary or moving obstacle. Because the collision danger is evaluated based on the speed of the vehicle, such systems are known as vehicle over-speed indicators.

Typically, such safety systems employ a radar device to determine whether there is a danger of a collision with an obstacle in the path of the vehicle. The radar sensor can determine whether the obstacle is in the path of the vehicle, and can also determine the distance from the vehicle to the obstacle and the speed of the obstacle. Typical safety systems further comprise a central processing unit (CPU) programmed to calculate a safe driving speed for the vehicle based on detected obstacles, or a minimum safe distance between the vehicle and such obstacles, based on the location and speed of the obstacles, the maximum deceleration rate of the vehicle (which can be a function of environmental conditions, such as road surface wetness etc), the reaction time of the driver, and the current speed of the vehicle. Examples of such systems can be found in U.S. Pat. Nos. 4,916,450, and 5,931,547.

A simplified block diagram of a conventional active automotive safety system is shown in FIG. 1. A flowchart describing the operating of such an automotive safety system as described is given in FIG. 2. The system incorporates Short Range Radar (SRR) sensors 12 for determining the location and velocity of obstacles 14 in the path of a vehicle 16. Data from these sensors are fed into a CPU 18 (step 30, FIG. 2). Vehicle input devices 20 feed the vehicle characteristics (which might include speed, turning angle, acceleration, traction and detected environmental conditions) into the CPU (step 32, FIG. 2). The CPU collects the data from all the sources and determines if the obstacle is in the path of the vehicle and further determines a safe driving speed of the vehicle (step 34, FIG. 2), or a safe distance between the vehicle and the obstacle. If there is a danger of a collision with the obstacle in the path of the vehicle, due to the speed of the vehicle being in excess of the safe driving speed (step 36, FIG. 2), or due to the distance between the vehicle and the object being less than the minimum safe distance, a warning signal is sent an output device 22 (step 38, FIG. 2). The output device could be, for example, an audio alarm or a visual danger indicator. The warning signal could be accompanied by a system overriding the driver controls to restore safe driving parameters, subject to safety concerns being met.

The safe driving speed calculation method conventionally used is a function of the velocities of the vehicle and the obstacle, and the distance to the obstacle. The reaction time of the driver and the expected deceleration of the vehicle are also factored in to determine a safe driving speed of the vehicle with respect to the obstacle. The driver reaction time is typically estimated by the automotive industry at 2.0 sec.

Typical vehicle safety systems which employ such calculations in determining the danger of a collision with an obstacle in the path of the vehicle, do not normally allow for the fact that the driver's reaction time is not constant.

However, U.S. Pat. No. 5,594,412 discloses a prior art vehicle safety system which determines a minimum safe distance of the vehicle to an obstacle in the path of the vehicle, where the driver reaction time is included in the calculation of the minimum safe distance. The invention disclosed in U.S. Pat. No. 5,594,412 employs an intrusive method to interrogate the driver by means of a device which provides a stimulus to the driver and which measures the resulting reaction time of the driver.

U.S. Pat. No. 5,594,412 has the advantage over other prior art vehicle safety systems in that the variation of the driver reaction time is included in the calculation of the minimum safe distance of the vehicle to an obstacle in the path of the vehicle.

Unfortunately an intrusive method to determine the driver reaction time, such as that disclosed in U.S. Pat. No. 5,594,412, has several drawbacks: firstly a regular driver of a vehicle employing an intrusive method which is regularly repeated to measure the driver reaction time, will tend to ignore the stimulus which is provided for measuring his or her reaction time; secondly an intrusive method is a nuisance to the driver; and thirdly an intrusive method to determine the driver reaction time can be hazardous, for example, if the stimulus is provided to the driver at a time when a critical driver response is required.

A great deal of research has been done to investigate the causes of car accidents (see, for example, "Simple reaction time, duration of driving and sleep deprivation in young versus old automobile drivers", P. Philip et al., J. Sleep Res. (1999) Vol. 8, Page 9). Apart from the physical and environmental conditions of the car and its surroundings, suggests that driving performance is affected by age, duration of drive, duration of breaks in driving, caffeine intake, etc. The conclusions of that paper are that public awareness, particularly in young drivers, needs to be raised with respect to excessive length of driving.

In a thesis submitted to the faculty of the Virginia Polytechnic and State University, Jun. 3, 2003 by Dennis James Collins and entitled "An examination of driver performance under reduced visibility conditions when using an in-vehicle signing information system (ISIS)", it is concluded that a system providing the type of information currently found on road signs as an artificial driving aid in an in-vehicle information system is of particular benefit during difficult driving conditions such as in bad weather at night. It is further concluded that such systems are of greater relevant benefit to older drivers compared to younger drivers.

Another example of research is "Reaction time of drivers to road stimuli" by Thomas J Triggs and Walter G Harris, June 1982, ISBN 0 86746 147 0. This paper uses yet another research approach in which the subjects were unobtrusively observed in real world situations rather than being briefed subjects in an experimental situation. The conclusions drawn were that faster drivers have lower reaction times and that certain types of road situation (such a railway level crossing signals and speed detection devices) have the highest response rates for drivers.

It is clear from the range of research referred to above that driver performance is perceived to involve a multiplicity of often conflicting factors. It is for this reason that current automated systems tend to assign a standardised driver reaction time of e.g. 2 seconds or 2.5 seconds.

DISCLOSURE OF THE INVENTION

The present invention provides a method for providing an indication that a vehicle has exceeded a safe driving speed, the method comprising the steps of:
measuring a current speed of said vehicle;
detecting an obstacle in the path of said vehicle and performing a measurement thereon;
calculating a predicted reaction time of a driver of said vehicle;
calculating a safe driving speed of the vehicle based on said predicted reaction time and said measurement performed on said obstacle; and
providing an indication when the measured current speed of the vehicle exceeds the calculated safe driving speed;
wherein the step of calculating a predicted reaction time of the driver comprises multiplying a generic driver reaction time by at least one scaling factor.

An advantage of this method is that it allows for the reaction time of the driver to vary according to the scaling factor chosen. A further advantage is that the calculation of the predicted reaction time of the driver can be performed unobtrusively, i.e. without testing, and potentially distracting, the driver.

Preferably, the step of calculating said predicted reaction time further comprises determining said at least one scaling factor from a look-up table.

Preferably, the step of calculating said predicted reaction time comprises measuring a duration of a current driving session and selecting said at least one scaling factor based on the measured duration of the current driving session.

Preferably, the step of calculating said predicted reaction time comprises prompting the driver for an input and selecting said at least one scaling factor based on said input.

Preferably, said input is a parameter selected from a driver age, a driver age range, a driver experience level, a driver qualification and a driver license status.

With this parameter, a driver with a provisional or restricted license may be expected to be a less experienced driver than someone with a full license, and consequently may have a longer reaction time.

Preferably, the step of calculating said predicted reaction time comprises retrieving a stored parameter from a memory device and selecting said at least one scaling factor based on said retrieved parameter.

Preferably, the step of calculating said predicted reaction time comprises detecting an environmental condition of the vehicle's external environment and selecting a scaling factor based on said detected environmental condition.

Preferably, said environmental condition is selected from a visibility level, a weather condition, and an external light level.

It will be understood that in adverse weather conditions, for example fog, rain, hail, etc., the visibility level of the driver may be impeded, and consequently the reaction time of the driver may be increased. This method takes into account these factors when calculating the predicted reaction time of the driver.

The invention further provides an apparatus for providing an indication that a vehicle has exceeded a safe driving speed, the apparatus comprising:
a speed measurement device for measuring a current speed of said vehicle;
a sensor for detecting an obstacle in the path of said vehicle and performing a measurement thereon;
a reaction time calculator for calculating a predicted reaction time of a driver of said vehicle;
a processor programmed to calculate a safe driving speed of the vehicle based on said predicted reaction time and said measurement performed on said obstacle; and
an output for providing an indication when the measured current speed of the vehicle exceeds the calculated safe driving speed;
wherein the reaction time calculator operates to calculate a predicted reaction time of the driver by multiplying a generic driver reaction time by at least one scaling factor.

It is to be noted that while the preferred output provides an alert to the driver that a safe speed has been exceeded (such as a visual and/or auditory alarm), it is also possible for the output to be directed to a control system of the vehicle (e.g. the brakes or throttle) or to a recording device (such as a regulatory device or a "black box" type recorder) or to be transmitted to an external system (e.g. the vehicle in front or to a railroad control centre or an air traffic control tower).

The invention also provides a method for providing an indication that a vehicle's distance to an obstacle is less than the minimum required to safely avoid the obstacle, the method comprising the steps of:
measuring a current speed of said vehicle;
detecting an obstacle in the path of said vehicle and measuring the distance thereto;
calculating a predicted reaction time of a driver of said vehicle;
calculating a safe minimum distance to the obstacle from the vehicle based on said predicted reaction time and said measured distance to said obstacle; and
providing an indication when the measured current distance to said obstacle is less than the calculated safe minimum distance;
wherein the step of calculating a predicted reaction time of the driver comprises multiplying a generic driver reaction time by at least one scaling factor.

The skilled person will appreciate that a system which is designed to provide an output when a safe driving speed has been exceeded can be readily adapted to provided an output when a safe minimum driving distance threshold has been crossed, once the distance to an obstacle is known, since braking distance and current speed are highly correlated. Accordingly, the above formulation of the method steps are seen as an alternative solution to the method based on safe driving speeds.

In a further aspect, the invention provides a method for providing an indication that a vehicle has exceeded a safe driving speed, the method comprising the steps of:
measuring a current speed of said vehicle;
detecting an obstacle in the path of said vehicle and measuring the distance to said obstacle and the speed of said obstacle;
determining an estimated maximum deceleration speed of said obstacle;
determining an estimated reaction time of a driver of said vehicle;
calculating a safe driving speed of the vehicle based on:
    (i) the current speed of said vehicle;
    (ii) the distance to said obstacle;
    (iii) the speed of said obstacle;
    (iv) the estimated maximum deceleration of said vehicle
    (v) the estimated maximum deceleration of said obstacle; and
    (vi) the estimated reaction time of said driver.

This method takes account of the maximum possible deceleration of an obstacle in the vehicle's path, and calculates the safe driving speed on the worst-case-scenario that the obstacle may decelerate suddenly and without warning, thereby providing additional safety to a driver.

BRIEF DESCRIPTION OF THE DRAWINGS

The invention will now be further illustrated by the following description of embodiments thereof given by way of example only with reference to the accompanying drawings, in which:

FIG. 5 is a look-up table showing driving time scaling factors;

FIG. 6 is a look-up table showing driving age scaling factors;

FIG. 7 is a look-up table showing visibility scaling factors; and

FIG. 8 is a look-up table showing driving experience scaling factors.

DETAILED DESCRIPTION OF PREFERRED EMBODIMENTS

Figure 1:
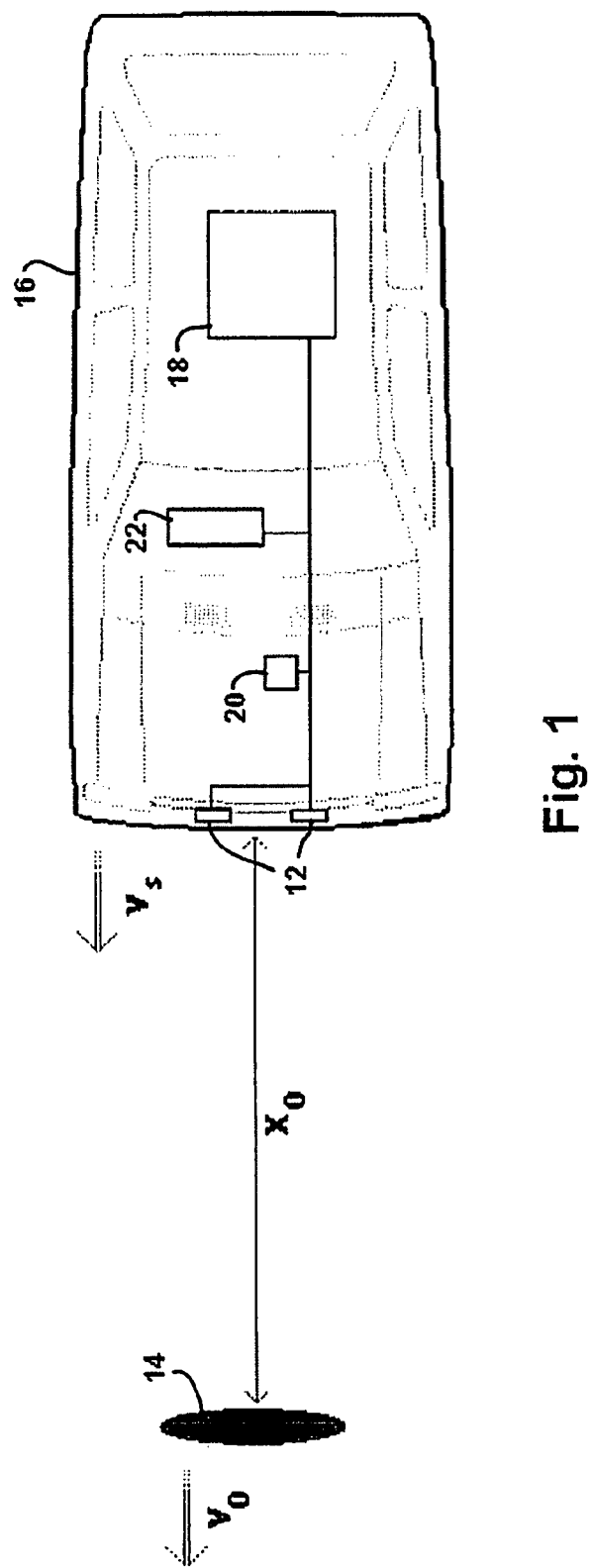
FIG. 1 is a block diagram of a prior art vehicle incorporating a known safety system.
Figure 2:
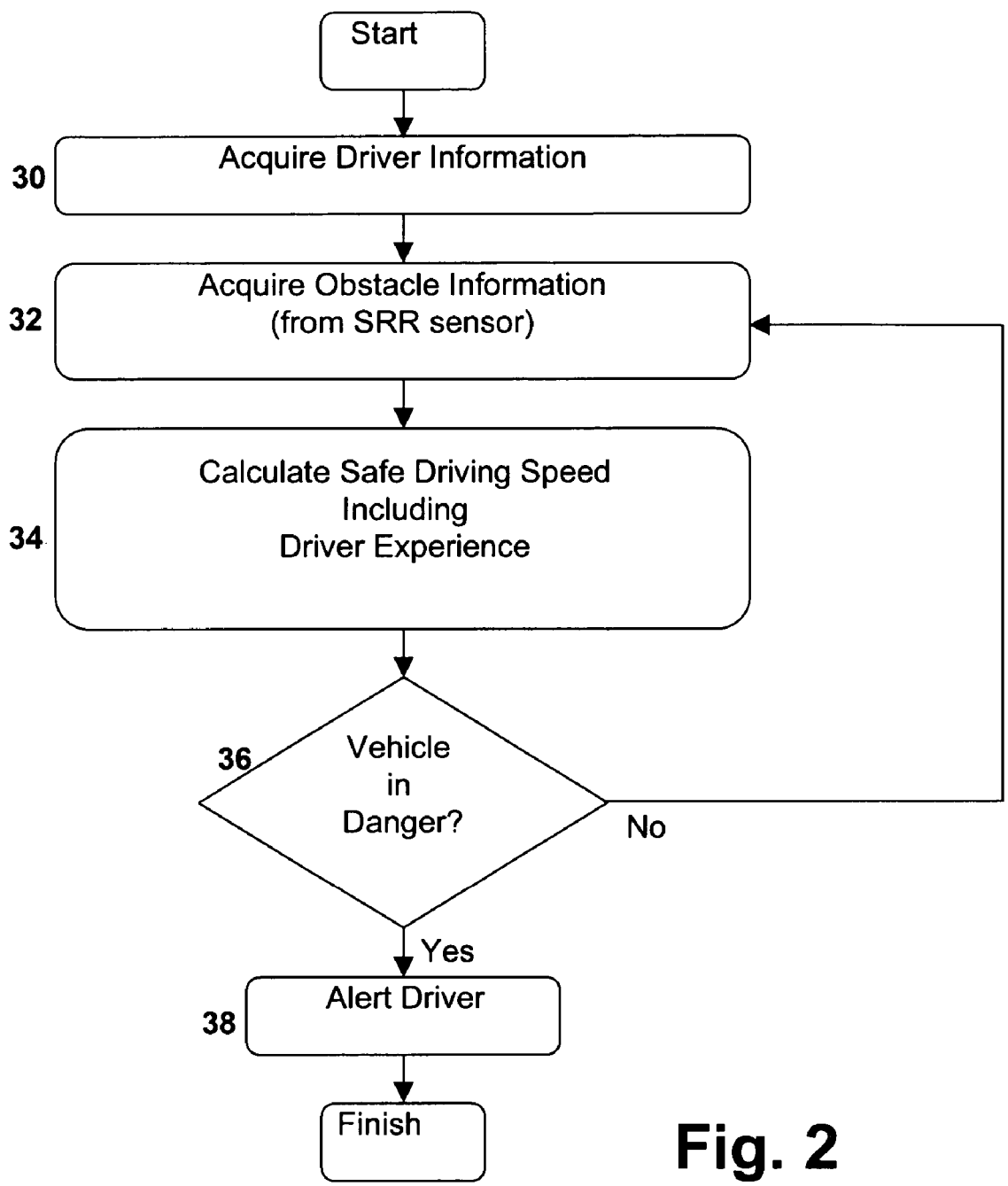
FIG. 2 is a flowchart illustrating the operation of the prior art system of FIG. 1.
Figure 3:
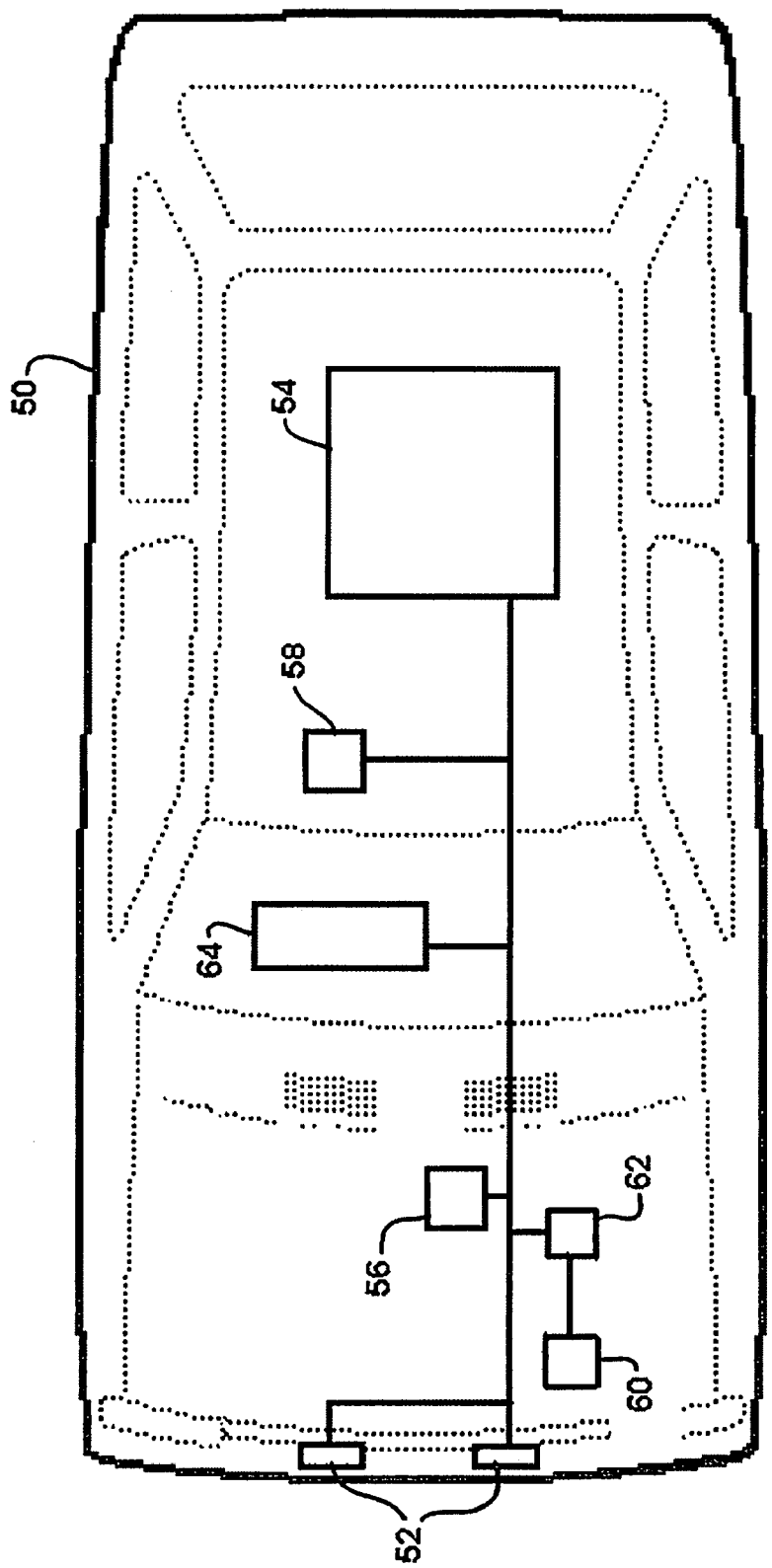
FIG. 3 is a block diagram of a vehicle incorporating an apparatus according to the invention.
Figure 4:
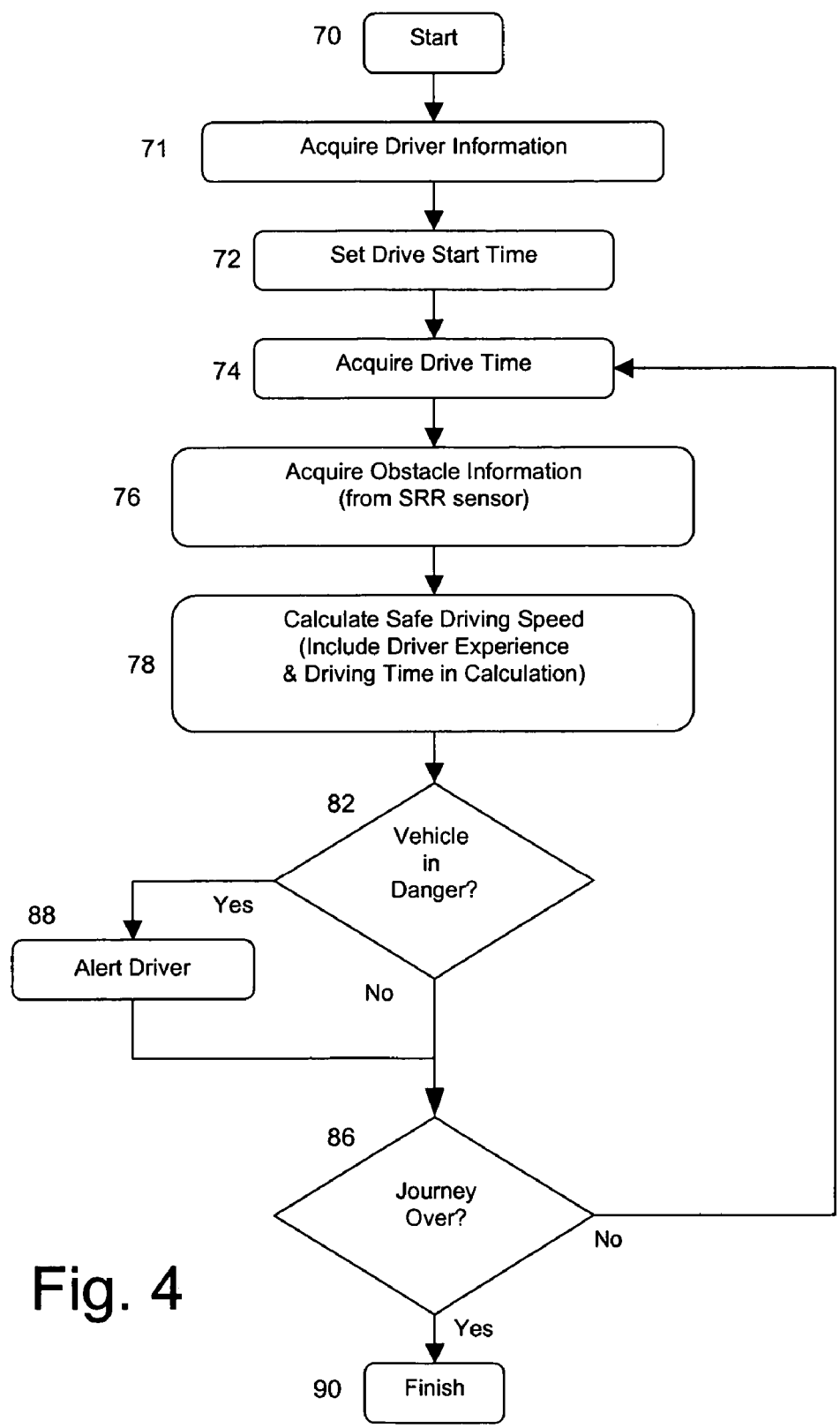
FIG. 4 is a flowchart illustrating the operation of a method according to the invention.

A preferred embodiment of the vehicle over speed warning system of the present invention is shown in FIGS. 3 and 4. FIG. 3 shows a schematic diagram of the over speed warning system of a preferred embodiment of the present invention. A flowchart detailing the operation of the over speed warning system of the present invention is provided in FIG. 4.

As shown in FIG. 3, a vehicle 50 is provided with a number of short-range radar (SRR) sensors 52 for detecting obstacles in the path of the vehicle. (Similar sensors may be provided at the rear of the vehicle but are not shown in FIG. 3). As in known systems, the output of the SRR sensors 52 are provided to a central processing unit (CPU) 54 to determine the position and speed of obstacles. Various vehicle systems provide vehicle inputs, represented schematically at 56, to the CPU 54. Such vehicle inputs include speed, and can also include items such as detected traction, acceleration, deceleration or brake force, turning angle, vehicle balance, and so on.

A driver input 58 is provided to enable a driver to manually input his or her age and/or experience level. The experience level can, for example, be categorised as learner, restricted and full.

Drivers who have not yet passed the driving test are categorised as learner; drivers who have recently passed the driving test or drivers who have been restricted by the driving authorities are categorised as restricted, and experienced drivers with a full license are categorised as full.

Driver input 58 can be replaced by a card reader which can reads the driver's age and experience level from, for example, a card encoding driving license details. Alternatively, a card might be provided by an insurance company with details of an experience level or competency level assigned to the driver and the driver's age.

The vehicle also incorporates a visibility detector which detects an indicator of visibility levels. This can be a simple photo sensor for detecting light levels, or can incorporate more sophisticated weather detectors for detecting rain, mist, fog, etc.

The vehicle ignition system 60, which is activated whenever the vehicle is switched on, is connected to a clock 62 which maintains a running total of the current drive time. This clock may reset every time the vehicle is switched off, or it may be provided with intelligence to only reset when the vehicle has switched off for more than a predetermined period of time, such as fifteen or thirty minutes. Such a clock provides an indication of the current journey time.

Referring now to FIG. 4, a process carried out by a system of invention is shown which starts at step 70. When the system is activated, the driver information is acquired from the driver input in the manner described above. The system may be set up to acquire driver information on every trip, or it may retrieve driver information from storage if such information has previously been entered, step 71. By requiring the insertion of, for example, a driving license there can be an assurance that the correct data for the current driver is entered.

In step 72, the drive start time is set when the ignition is switched on, as described above. The system then operates in a loop where the drive time is updated or acquired at the beginning of each iteration, step 74.

Next, obstacle information is acquired from the SRR sensor, step 76. Optionally, further steps (not shown) can determine other factors which will influence the calculation of the driver reaction time, such as visibility or weather information, or data indicative of the driver's age or driving experience level. A safe driving speed is then calculated in the manner described below based on at least the SRR obstacle information and the current drive time elapsed, step 78.

In step 82, a determination is made whether the vehicle is in danger based on the safe driving speed and the current driving speed. If it is determined that there is no danger, then the system checks whether the journey is over (the ignition has been switched off), step 86 and if not, the next iteration begins at step 74. If it is determined that the vehicle is in danger, then the driver is alerted in step 88 via output 64. This process continues repeatedly until the journey has been finished, step 90.

The algorithm used to determine a safe driving speed is determined using Equation 1 below.

$$v_s = \sqrt{D_v^2 t_R'^2 + 2\left(\frac{v_0^2}{2D_0} + x_0\right)D_v} - D_v t_R' \qquad \text{Equation 1}$$

Where $v_s$ is the maximum safe driving speed
$t_R$ is the driver reaction time,
$D_v$ is the deceleration of the vehicle,
$V_0$ is the speed of the obstacle,
$X_0$ is the distance to the object,
$D_0$ is the maximum deceleration of the obstacle,
and where the modified driver reaction time $t'_R$ is determined by the following formula $$t'_R = t_R \times F_d \times F_a \times F_v \times F_e \qquad \text{Equation 2}$$

where $t_R$ is the driver reaction time, $F_d$ is the driving time scaling factor, and $F_a$ is the driver age scaling factor, $F_v$ is the visibility scaling factor and $F_e$ is the experience scaling factor.

The driving time scaling factor $F_d$ is determined using the look-up table shown in FIG. 5. It can be seen from FIG. 5 that driver reaction time is unaffected (factor=1.00) for driving times of up to one hour. The factor is progressively increased for period of 1-4 hours and 4-8 hours, with a significant penalty being applied for driving times in respect of driving times in excess of eight hours.

The driver age scaling factor $F_a$ is determined using the look-up table shown in FIG. 6. It can be seen from FIG. 6 that in the embodiment employed in the present application, the base reaction time is applied unaltered for drivers in the age group 20-40. A 10% increase in the assumed reaction time is applied for drivers aged 15-19 or 40-60. This penalty is increased to 20% for drivers in the 60-70 age bracket and to 25% for drivers aged over 70.

The visibility scaling factor $F_v$ is determined using the look-up table shown in FIG. 7. Visibility is classified as very good, good, fair or poor according to the type of sensor and to the criteria imposed by the system designer. Factors of 1, 1.1, 1.2 and 1.4 are applied respectively for each classification of visibility.

The driver experience scaling factor $F_e$ is determined using the look-up table shown in FIG. 8. As explained above, driver experience can be rated at beginner, restricted or full, and in this case beginners are most heavily penalised (33% greater reaction time that full drivers) and restricted drivers are penalised by 11% with respect to full drivers.

If the vehicle is travelling faster than the safe driving speed the driver is warned by the vehicle over speed indicator. The warning can be an audio signal (for example from a loudspeaker located on the inside of the vehicle and in the vicinity of the driving seat), or by a visual indicator (for example by a display panel located within the field of vision of the driver of the car).

It is to be understood that the illustrated system takes into account all of the factors set out in FIGS. 5, 6, 7 and 8. However, the invention can be implemented with a subset of scaling factors according to the sophistication of the system and the intentions of the system designers. In the event that one or more of the factors cannot be reliably determined at any given time, this system provides the advantage that the driver reaction time can nevertheless be multiplied by the scaling factors for any of the other available parameters, and most importantly, the driving time scaling factor should always be determinable. In this way, it should always be possible to impose a significant penalty on the estimated driver reaction time for drivers engaged in very long journeys without a break, which are perceived to give rise to a particular concern.

We claim:

1. A method for providing an indication that a vehicle has exceeded a safe driving speed, the method comprising the steps of:
   measuring a current speed of said vehicle;
   detecting an obstacle in the path of said vehicle and measuring at least one of distance to the obstacle or speed of the obstacle;
   calculating a predicted reaction time of a driver of said vehicle;
   calculating a safe driving speed of the vehicle based on said predicted reaction time and said measurement performed on said obstacle; and
   providing an indication when the measured current speed of the vehicle exceeds the calculated safe driving speed;
   wherein the step of calculating a predicted reaction time of the driver comprises multiplying a generic driver reaction time by at least one scaling factor.

2. A method as claimed in claim 1, wherein the step of calculating said predicted reaction time further comprises determining said at least one scaling factor from a look-up table.

3. A method as claimed in claim 1, wherein the step of calculating said predicted reaction time comprises measuring a duration of a current driving session and selecting said at least one scaling factor based on the measured duration of the current driving session.

4. A method as claimed in claim 1, wherein the step of calculating said predicted reaction time comprises prompting the driver for an input and selecting said at least one scaling factor based on said input.

5. A method as claimed in claim 4, wherein said input is a parameter selected from a driver age, a driver age range, a driver experience level, a driver qualification and a driver license status.

6. A method as claimed in claim 1, wherein the step of calculating said predicted reaction time comprises retrieving a stored parameter from a memory device and selecting said at least one scaling factor based on said retrieved parameter.

7. A method as claimed in claim 1, wherein the step of calculating said predicted reaction time comprises detecting an environmental condition of the vehicle's external environment and selecting a scaling factor based on said detected environmental condition.

8. A method as claimed in claim 7, wherein said environmental condition is selected from a visibility level, a weather condition, and an external light level.

9. A method as claimed in claim 1 wherein said step of performing a measurement comprises measuring the distance to said obstacle and the speed of said obstacle and said method further comprises
   determining an estimated maximum deceleration speed of said obstacle; and
   wherein said calculating a safe driving speed of the vehicle is further based on:
   the current speed of said vehicle,
   the estimated maximum deceleration of said vehicle, and
   the estimated maximum deceleration of said obstacle.

10. A method as claimed in claim 9, wherein the step of calculating a safe driving speed employs the following equation to perform said calculation:

$$v_s = \sqrt{D_v^2 t_R'^2 + 2\left(\frac{v_0^2}{2D_0} + x_0\right)D_v} - D_v t_R'$$

wherein:
   $v_s$ is the calculated safe driving speed,
   $t_R'$ is the predicted driver reaction time,
   $D_v$ is a deceleration value for the vehicle,
   $V_0$ is the speed of the obstacle,
   $X_0$ is the distance to the object, and
   $D_0$ is the estimated maximum deceleration of the obstacle,
   wherein the predicted driver reaction time $t_R'$ is determined by the following formula:

$t_R' = t_R \times F$ and wherein $t_R$ is a generic driver reaction time, and F is a scaling factor based on at least one of: an elapsed driving time, a driver age, scaling factor, a visibility scaling factor, and a driver experience scaling factor.

11. An apparatus for providing an indication that a vehicle has exceeded a safe driving speed, the apparatus comprising:
   a speed measurement device for measuring a current speed of said vehicle;
   a sensor for detecting an obstacle in the path of said vehicle and measuring at least one of distance to the obstacle or speed of the obstacle;

a reaction time calculator for calculating a predicted reaction time of a driver of said vehicle;

a processor programmed to calculate a safe driving speed of the vehicle based on said predicted reaction time and said measurement performed on said obstacle; and an output for providing an indication when the measured current speed of the vehicle exceeds the calculated safe driving speed, wherein the reaction time calculator operates to calculate a predicted reaction time of the driver by multiplying a generic driver reaction time by at least one scaling factor.

12. An apparatus as claimed in claim 11, the apparatus further comprising at least one look-up table stored in memory, wherein the at least one scaling factor is determined from said at least one look-up table.

13. An apparatus as claimed in claim 11, the apparatus further comprising a clock, the clock operable to measure a duration of a current driving session, the selection of the at least one scaling factor based on the measured duration of the current driving session.

14. An apparatus as claimed in claim 11, the apparatus further comprising an input device for the driver, the selection of the at least one scaling factor based on the input from the driver.

15. An apparatus as claimed in claim 14, wherein the input device comprises a card reader, the card reader operable to read a card encoded with the driving licence details of a driver of the vehicle.

16. An apparatus as claimed in claim 14, wherein said input is a parameter selected from a driver age, a driver age range, a driver experience level, a driver qualification and a driver license status.

17. An apparatus as claimed in claim 11, the apparatus further comprising at least one sensor device operable to detect an environmental condition of the vehicle's external environment, wherein selecting the at least one scaling factor is based on said detected environmental condition.

18. An apparatus as claimed in claim 17, wherein the sensor device comprises a light level sensor.

19. An apparatus as claimed in claim 17, wherein the sensor device comprises a rain sensor.

20. A method for providing an indication that a vehicle's distance to an obstacle is less than the minimum required to safely avoid the obstacle, the method comprising the steps of:
measuring a current speed of said vehicle;
detecting an obstacle in the path of said vehicle and measuring the distance thereto;
calculating a predicted reaction time of a driver of said vehicle;
calculating a safe minimum distance to the obstacle from the vehicle based on said predicted reaction time and said measured distance to said obstacle; and providing an indication when the measured current distance to said obstacle is less than the calculated safe minimum distance;

wherein the step of calculating a predicted reaction time of the driver comprises multiplying a generic driver reaction time by at least one scaling factor.

21. A method as claimed in claim 20, wherein said at least one scaling factor F is calculated as $F=F_d \times F_a \times F_v \times F_e$, and wherein:

$F_d$ is a driving time scaling factor,
$F_a$ is a driver age scaling factor,
$F_v$ is a visibility scaling factor, and
$F_e$ is an experience scaling factor.

22. A method as claimed in claim 20, wherein said measuring the distance thereto comprises measuring the distance to said obstacle and the speed of said obstacle, and wherein said method further comprises
determining an estimated maximum deceleration speed of said obstacle; and
calculating a safe driving speed of the vehicle based on:
the current speed of said vehicle,
the distance to said obstacle,
the speed of said obstacle,
the estimated maximum deceleration of said vehicle,
the estimated maximum deceleration of said obstacle, and
the predicted reaction time of said driver.

23. A method as claimed in claim 22, wherein the step of calculating a safe driving speed employs the following equation to perform said calculation:

$$v_s = \sqrt{D_v^2 t_R'^2 + 2\left(\frac{v_0^2}{2D_0} + x_0\right)D_v} - D_v t_R'$$

wherein:
$v_s$ is the calculated safe driving speed,
$t_R'$ is the predicted driver reaction time,
$D_v$ is a deceleration value for the vehicle,
$V_0$ is the speed of the obstacle,
$X_0$ is the distance to the object, and
$D_0$ is the estimated maximum deceleration of the obstacle; and wherein the predicted driver reaction time $t_R'$ is determined by the following formula:

$t_R' = t_R \times F$ wherein $t_R$ is a generic driver reaction time, and F is a scaling factor based on at least one of: an elapsed driving time, a driver age scaling factor, a visibility scaling factor, and a driver experience scaling factor.

* * * * *